United States Patent
Pelta et al.

(10) Patent No.: US 12,061,865 B2
(45) Date of Patent: *Aug. 13, 2024

(54) SYSTEM AND METHOD FOR MANAGING DATA SHARE REQUESTS

(71) Applicant: Synchrony Bank, Stamford, CT (US)

(72) Inventors: Murray Pelta, Atlanta, GA (US);
Rachel Marks, Kansas City, KS (US);
Sven Miller, Salt Lake City, UT (US);
Annmarie Nowak, Bartlett, IL (US);
Joseph Jurchak, Valatie, NY (US);
James McCarthy, Matthews, NC (US);
Christine Schultz, Stamford, CT (US);
Justin Heller, Stamford, CT (US)

(73) Assignee: Synchrony Bank, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/548,049

(22) Filed: Dec. 10, 2021

(65) Prior Publication Data
US 2022/0171921 A1   Jun. 2, 2022

Related U.S. Application Data

(63) Continuation of application No. 15/666,800, filed on Aug. 2, 2017, now Pat. No. 11,232,256.

(51) Int. Cl.
*G06F 40/174* (2020.01)
*G06Q 10/0635* (2023.01)
(52) U.S. Cl.
CPC ....... *G06F 40/174* (2020.01); *G06Q 10/0635* (2013.01)

(58) Field of Classification Search
CPC .................. G06F 40/174; G06Q 10/0635
(Continued)

(56) References Cited

U.S. PATENT DOCUMENTS 7,921,045 B1 * 4/2011 Mamorsky ............ G06Q 40/00
705/35
9,870,579 B2   1/2018 Zuccarino et al.
(Continued)

OTHER PUBLICATIONS

B. C. Singh, B. Carminati and E. Ferrari, "A Risk-Benefit Driven Architecture for Personal Data Release (Invited Paper)," 2016 IEEE 17th International Conference on Information Reuse and Integration (IRI), Pittsburgh, Pa, USA, 2016, pp. 40-49, doi: 10.1109/IRI.2016. 14. (Year: 2016).*

(Continued)

*Primary Examiner* — Stephen S Hong
*Assistant Examiner* — Nicholas Hasty
(74) *Attorney, Agent, or Firm* — Polsinelli LLP

(57) ABSTRACT

A system and method for managing data share requests. An electronic form processing module receives a request to share data relating to an organization with an entity not affiliated with the organization. The request includes responses to questions presented in an electronic form. At least some of the questions presented in the electronic form are presented based on a response to a previously asked question in the electronic form. A score calculation module calculates a score based on the responses to the questions presented in the electronic form. A risk analysis module determines whether to approve, deny or escalate the request to share databased on the score.

30 Claims, 16 Drawing Sheets

(58) Field of Classification Search
USPC .......................................................... 715/224
See application file for complete search history.

(56) References Cited

U.S. PATENT DOCUMENTS

| | | | |
|---|---|---|---|
| 2002/0120474 A1* | 8/2002 | Hele | G06Q 10/10 |
| | | | 705/4 |
| 2003/0153991 A1 | 8/2003 | Visser et al. | |
| 2004/0139421 A1 | 7/2004 | Hall | |
| 2006/0089861 A1* | 4/2006 | King | G06Q 40/08 |
| | | | 705/4 |
| 2014/0129457 A1* | 5/2014 | Peeler | G06Q 30/018 |
| | | | 705/317 |
| 2014/0143165 A1 | 5/2014 | Posse et al. | |

OTHER PUBLICATIONS

Singh, B.C. et al., "A Risk-Benefit Driven Architecture for Personal Data Release," 2016 IEEE 17 International Conference on Information Reuse and Integration, Dec. 19, 2016.
Office Action mailed May 10, 2018 in U.S. Appl. No. 15/666,800.
Office Action mailed Oct. 5, 2018 in U.S. Appl. No. 15/666,800.
Office Action mailed Jun. 13, 2019 in U.S. Appl. No. 15/666,800.
Office Action mailed Feb. 21, 2020 in U.S. Appl. No. 15/666,800.
Office Action mailed Dec. 18, 2020 in U.S. Appl. No. 15/666,800.
Office Action mailed Apr. 7, 2021 in U.S. Appl. No. 15/666,800.
Notice of Allowance mailed Oct. 6, 2021 in U.S. Appl. No. 15/666,800.

* cited by examiner

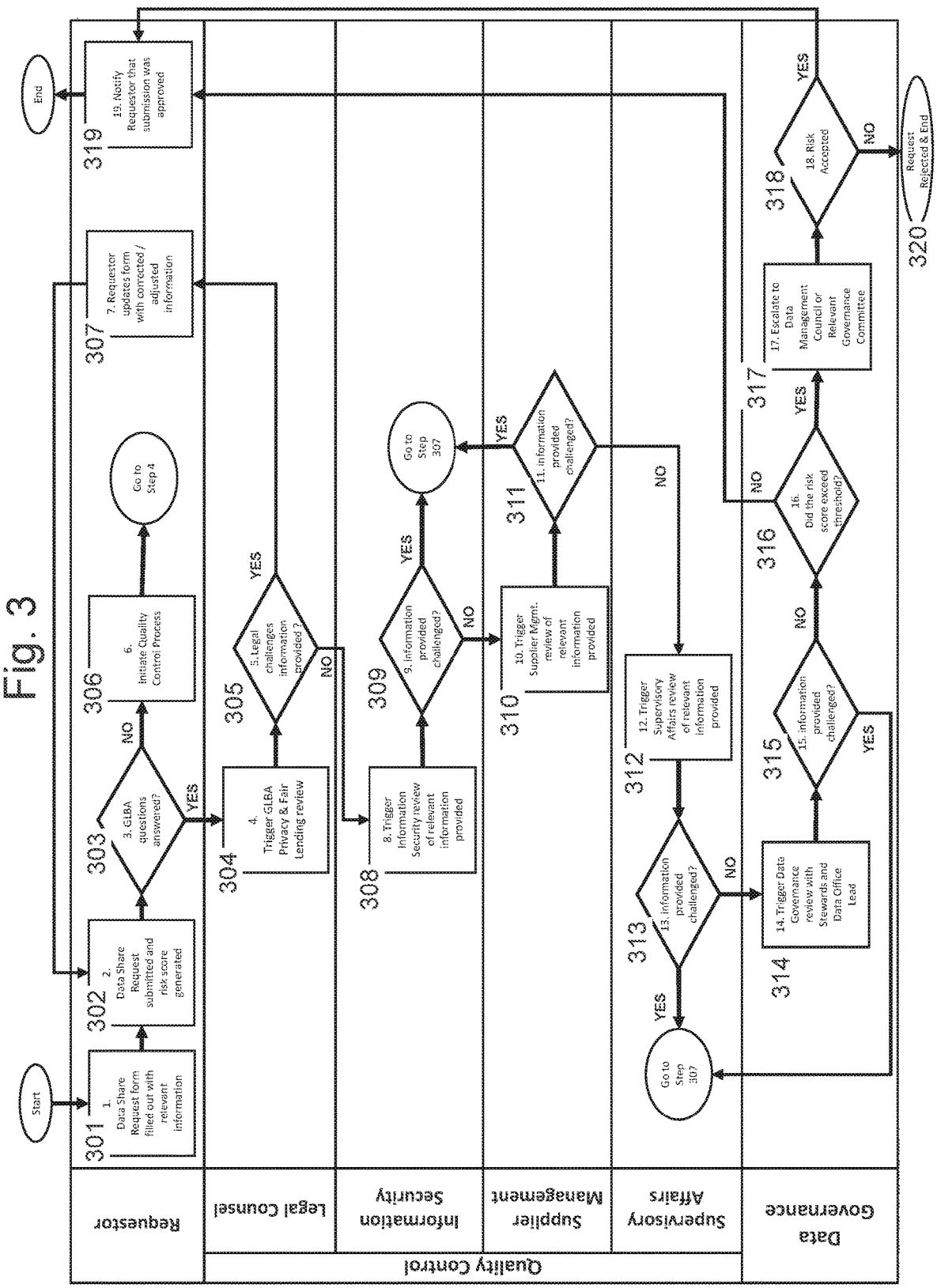

Fig. 4A

| Question Number | Question | Validation | Requirements | Options |
|---|---|---|---|---|
| 0 | BEFORE ANY QUESTIONS: Header: Data Sharing Request Form Instruction: Please enter a name for the data transmission. | n/a | • Free Form Text box<br>• No scoring (informational)<br>• No Routing or Triggering<br>• NOTE: For renewals, the name entered should be similar to the name of the data transmission associated with the renewal. | Free Form Text |
| 1 | Select the type of request for this data share transmission. | n/a | • Question must display<br>• Answer must be provided<br>• Drop down list or radio button<br>• Only one option can be selected<br>• When Q1 is answered (Renewal or Amendment) then Q2 is displayed next | Renewal<br>Amendment<br>New |
| 2 | Search and select the name of the data transmission associated with this renewal/amendment. | n/a | • Answer must be provided<br>• Search and Select Text box<br>• No Scoring (informational)<br>• Search by Name only<br>• Search results displays both the Name and Data Share request sequence number<br>• Only one search result name can be selected | Search & Select Text Field<br>NOTE: Search results display both the data transmission name and number. Only the data transmission number will display once a data transmission name is selected |
| 3 | How will the recipient use the data? | Legal Counsel if = Marketing or Other Activities<br>Supervisory Affairs if = Credit, Compliance or Risk Activities | • Question must display<br>• Answer must be provided<br>• Drop down list or radio button<br>• Only one option can be selected<br>• Scoring based on Option selected<br>• Route to Legal for GLBA Validation | 1. Other Activities<br>2. Marketing Campaigns<br>3. Credit Activities<br>4. Compliance Activities<br>5. Risk Activities |
| 4 | Enter the Recipient/Third Party legal entity name associated with this request in the field provided. | n/a | • Question must display<br>• Answer must be provided<br>• Free Form Text box<br>• Must be answered<br>• No scoring (informational)<br>• When Q3 is answered (2. Marketing ...) then Q5 is displayed next after Q4 | Free Form Text |
| 5 | Select the appropriate offering associated with this request. | Legal Counsel | • Answer must be provided<br>• Drop down list or radio button<br>• Only one option can be selected<br>• Scoring based on Option selected | 3. Unrelated<br>5. Bank Offer (include Bank) |

Fig. 4B

| Question Number | Question | Validation | Requirements | Options |
|---|---|---|---|---|
| 6 | Select the method of transmission that will be used for this data transfer. | Information Security | • Question must display<br>• Answer must be provided<br>• Drop down list or radio button<br>• Only one option can be selected<br>• Scoring based on Option selected | 1. Physical Media<br>2. Electronic Data Exchange<br>4. External Library<br>4. Real-time access<br>5. Email |
| 6.1 | Enter the external library URL in the field provided. | n/a | • When Q6 is answered (External Library) then Q6.1 is displayed after 6<br>• Answer must be provided<br>• URL Text box<br>• No scoring (informational) | URL Text Field |
| 6.2 | Enter External Library Community Name. | n/a | • When Q6 is answered (External Library) then Q6.2 is displayed after 6.1<br>• Answer must be provided<br>• URL Text box<br>• No scoring (informational) | Text Field |
| 6.3 | Enter External Library Community description/purpose. | n/a | • When Q6 is answered (External Library) then Q6.3 is displayed after 6.2<br>• Answer must be provided<br>• URL Text box<br>• No scoring (informational) | Text Field |
| 6.4 | Choose External Library Community type. | Information Security | • When Q6 is answered (External Library) then Q6.4 is displayed after 6.3<br>• Drop down list or radio button<br>• Only one option can be selected<br>• Answer must be provided<br>• URL Text box<br>• No scoring (informational) | • Open<br>• Restricted |

Fig. 4C

| Question Number | Question | Validation | Requirements | Options |
|---|---|---|---|---|
| 6.5 | If you are sharing records, please select all record series that apply. | n/a | • When Q6 is answered (External Library) then Q6.5 is displayed after Q6.4<br>• Answer Should be Optional<br>• Search and Select Text Field (Multiple Selections)<br>• One or more options can be selected<br>• No scoring (informational) | • Search & Select Text Field of Record Types/Series |
| 6.6 | What is the Client Access method for Real-time access? | Information Security | • When Q6 is answered (Real-time access) then Q6.6 is displayed as the next question after Q6<br>• Answer must be provided<br>• Drop down list or radio button<br>• Only one options can be selected<br>• No scoring (informational) | • Internet<br>• Dedicated line<br>• Other |
| 6.7 | What is the type of end user access for Real-time access? | Information Security | • When Q6 is answered (Real-time access) then Q6.7 is displayed as the next question after Q6.6<br>• Answer must be provide<br>• Drop down list or radio button<br>• Only one options can be selected<br>• No scoring (informational) | • Client/Retailer Only<br>• Cardholder/Consumer Only<br>• Both<br>• Other |
| 6.8 | Enter the Client URL for Real-time access. | n/a | • When Q6 is answered (Real-time access) then Q6.8 is displayed after 6.7<br>• Answer is optional<br>• URL Text box<br>• No scoring (informational) | URL Text Field |
| 6.9 | Is there a current hosting agreement in place with the client for Real-time Access? | Information Security | • When Q6 is answered (Real-time access) then Q6.9 is displayed as the next question after Q6.8<br>• Answer must be provide<br>• Drop down list or radio button<br>• Only one options can be selected<br>• No scoring (informational) | • Yes<br>• No |

Fig. 4D

| Question Number | Question | Affiliation | Requirements | Options |
|---|---|---|---|---|
| 6.10 | What is the purpose of the Real-time Access? | Information Security | • When Q6 is answered (Real-time access) then Q6.10 is displayed as the next question after Q6.9<br>• Answer must be provide<br>• Drop down list or radio button<br>• Only one options can be selected<br>• No scoring (informational) | • Account Summary<br>• Single sign on<br>• Auth Buyer Maintenance<br>• Apply (PS/CC)<br>• Account Lookup (PS/CC)<br>• Credit Limit Increase (PS/CC)<br>• Buy (Purchase) (PS/CC)<br>• Adjustment (Refund) (PS/CC)<br>• Authorization Only (PS/CC)<br>• Apply Status (PS/CC)<br>• Promo Disclosure (PS/CC)<br>• Other |
| 6.11 | List any other methods to be used for Real-time Access. | n/a | • When Q6 is answered (Real-time access) then Q6.11 is displayed after 6.10<br>• Answer is optional<br>• Text box<br>• No scoring (informational)<br>• Question must display | Text Field |
| 7 | Select the expected frequency that corresponds to this data transfer. (If not certain, select an estimated frequency.) | Information Security | • Answer must be provided<br>• Drop down list or radio button<br>• Only one option can be selected<br>• Scoring based on Option selected | 1. One Time Transfer<br>1. On Demand<br>2. Daily<br>2. Weekly<br>3. Monthly<br>4. Quarterly<br>5. Semi-annually<br>5. Annually |

Fig. 4E

| Question Number | Question | Affiliation | Requirements | Scoring |
|---|---|---|---|---|
| | | | Question Must Display | 1 month |
| | | | Trans method = Any and Frequency = One Time Transfer - Expiration period choices = 1 month, 3 months, 6 months | 3 months |
| | | | Trans method = Email and Frequency= Any - Expiration period choices = 1 month, 3 months, 6 months | 6 months |
| | | | Trans method = External Library and Frequency= Any - Expiration period choices = 1 month, 3 months, 6 months, 9 months, 1 year | 9 months |
| 7.1 | Choose the expiration period. | n/a | Trans Method = Physical Media, Gentran, Real-time access and Frequency = On Demand, Daily, Weekly, Monthly, Quarterly, Semi-annually, Annually - Expiration period choices = 1 month, 3 months, 6 months, 9 months, 1 year, Indefinitely | 1 year |
| | | | 1 month – expire 1 month after approval date<br>3 months – expire 3 months after approval date<br>6 months – expire 6 months after approval date<br>9 months – expire 9 months after approval date<br>1 year – expire 1 year after approval date<br>Indefinitely – expire 1 year after approval date | Indefinitely |
| | | | •When Q3 is answered (Marketing) then Q8 is displayed after Q7.1. If Q4 is not answered (Marketing) Q8 will not display. | 2. No |
| | | | •Answer must be provided | 4. Yes |
| 8 | Is this request for a Fair Lending workbook review? | Legal Counsel | •Drop down list or radio button<br>•Only one option can be selected<br>•Scoring based on Option selected | |

Fig. 4F

| Question Number | Question | Validation | Business Rules | Options |
|---|---|---|---|---|
| 9 | Has the Initial Privacy Notice for Declined Applicants been set up for declined applicants to receive the privacy notice? | Legal Counsel | • When Q3 is answered (Marketing) then Q9 is displayed after Q8. If Q3 is not answered (Marketing) Q9 will not display.<br>• Question must display<br>• Answer must be provided<br>• Drop down list or radio button<br>• Only one option can be selected<br>• No Scoring (Hard Rule)<br>• When answered (No) raise Error Message "the data is not permissible to share" and End Request<br>• When Q8 is answered (Yes) then Q10 is displayed after Q9. If Q8 is answered No Q10 is not displayed | • Yes<br>• No |
| 10 | Provide the MRM Campaign Number and Workbook File Name or the URL(s) where the documentation is stored. | n/a | • Answer must be provided<br>• URL Text box<br>• No scoring (informational) | URL Text Field |
| 11 | Did you use an Open To Buy Suppression? | Legal Counsel | • When Q8 is answered (Yes) then Q11 is displayed after Q 10. If Q8 is answered No Q11 will not display.<br>• Answer must be provided<br>• Drop down list or radio button<br>• Only one option can be selected<br>• No scoring (informational)<br>• When Q11 is answered (Yes) then Q11.1 is displayed after Q11. If Q11 is answered No Q11.1 will not display. | • Yes<br>• No |
| 11.1 | Is there a minimum spend amount? | Legal Counsel | • Answer must be provided<br>• Drop down list or radio button<br>• Only one option can be selected<br>• No scoring (informational)<br>• When Q11.1 is answered (No) then Q11.2 is displayed after 11.1. If Question Q11.1 is answered Yes then Q11.2 will not display. | • Yes<br>• No |
| 11.2 | If No minimum spend amount please explain. | n/a | • Answer must be provided<br>• Test Box<br>• No scoring (informational) | Text Box |

Fig. 4G

| Question Number | Question | Validation | Requirements | Options |
|---|---|---|---|---|
| 12 | What is the nature of the Third Party relationship with SYF? | Legal Counsel if =Client Partner; Supplier Management if = Vendor/Supplier or Partner Vendor | • Question must display<br>• Answer must be provided<br>• Drop down list or radio button<br>• Scoring based on Option selected | 1. Vendor/Supplier<br>2. Client/Partner<br>3. Partner Vendor<br>4. Credit Bureau<br>5. Regulatory Agency |
| | | Supervisory Affairs = Credit Bureau, Government Agency, Regulatory Agency | • When Q12 is answered (Regulatory Agency) then Q33 must display and an answer must be provided<br>• When Q12 is not answered (Regulatory Agency) then Q33 will not display. | |
| 13 | What is the Recipient's Supplier Management inherent Risk Rating? (Contact Supplier Management if not known) | Supplier Management if Q12 = Vendor/Supplier or Partner Vendor<br>otherwise none | • When Q12 is answered (Vendor/Supplier or Partner/Vendor) then Q13 is displayed next<br>• Answer must be provided<br>• Drop down list or radio button<br>• Only one option can be selected<br>• Scoring based on Option selected | 1. Low<br>2. Elevated<br>3. Priority<br>4. Critical<br>5. Don't Know |
| 14 | Is the Recipient/Third Party covered by existing contractual agreements? | Supplier Management | • Question must display<br>• Answer must be provided<br>• Drop down list or radio button<br>• Only one option can be selected<br>• Scoring based on Option selected<br>• When Q14 is answered (4. Yes) then Q15 is displayed next | 2. No<br>4. Yes<br>5. Don't Know |
| 15 | Enter the specific contractual term conditions. | Supplier Management | • Answer must be provided<br>• Free Form Text box<br>• No scoring (informational) | na |
| 16 | Is the Recipient/Third Party covered by existing policies? | Supplier Management | • Question must display<br>• Answer must be provided<br>• Drop down list or radio button<br>• Only one option can be selected<br>• Scoring based on Option selected | 2. No<br>4. Yes<br>5. Don't Know |
| 17 | Is information about non-US residents being shared? | Legal Counsel | • Question must display<br>• Answer must be provided<br>• Drop down list or radio button<br>• Only one option can be selected | • Yes<br>• No |

Fig. 4H

| Question Number | Question | Solution | Requirements | Options |
|---|---|---|---|---|
| 18 | What is the associated Business Objective? | Information Security | • Question must display<br>• Answer must be provided<br>• Drop down list or radio button<br>• Only one option can be selected<br>• Scoring based on Option selected | 1. N/A<br>2. Build for the Future<br>3. Grow the Core<br>4. Heightened Standards<br>5. Don't Know |
| 19 | Select the business process associated with this data transmission. | Legal Counsel if = Marketing or Other Functions<br><br>Supervisory Affairs if= Credit Functions, Compliance Functions or Risk Functions | • Question must display<br>• Answer must be provided<br>• Drop down list or radio button<br>• Only one option can be selected<br>• Scoring based on Option selected<br>• When Q3 is answered (Marketing) then Q20 must display and an answer must be provided<br>• When Q3 is not answered (Marketing) then Q20 will not display. | 1. Other Functions<br>2. Marketing Functions<br>3. Credit Functions<br>4. Compliance Functions<br>5. Risk Functions |
| 20 | Open the Excel Channel/Program Opt Out Guide and identify the suppression to be performed for this campaign. Then enter the Row Number from column A of the Excel document or enter the explanation in the field provided if not in accordance with Guide.<br><br>URL to Channel Program Opt out Guide Excel Doc: https://libraries.synchronyfinancial.com/download?fil eid=63758170010&entity_id=25286509101&sid=101 | Legal Counsel | • Free Form Text box<br>• No scoring (informational)<br>• URL to Channel Program Opt out Guide Excel Doc: https://libraries.synchronyfinancial.com/download?fi leid=63758170010&entity_id=25286509101&sid=10 1 | Free Form Text |
| 20.1 | Enter the complete URL(s) of the suppression supporting documentation, e.g. Waterfall, etc. | n/a | • When Q20 is triggered to be answered then Q20.1 is displayed after Q20<br>• Answer must be provided if Q20 is triggered to be answered<br>• Upload/Attach Document field<br>• URL Text box<br>• No scoring (informational) | • URL Text Field |
| 21 | Has the 3rd party completed the sourcing process? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |

Fig. 4I

| Question Number | Question | Validation | Requirements | Options |
|---|---|---|---|---|
| 21 | Has the 3rd party completed the sourcing process? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |
| 22 | Are SLAs in place with the 3rd party? | Supplier Management | • If Q12 is answered Vendor /Supplier or Partner/Vendor Question will display<br>• Answer must be provided<br>• Drop down list or radio button<br>• Only one option can be selected | • Yes<br>• No<br>• Don't Know |
| 23 | Has the 3rd party environment been reviewed by Information Security (3PC)? | Supplier Management | • If Q12 is answered Vendor /Supplier or Partner/Vendor Question will display<br>• Answer must be provided<br>• Drop down list or radio button<br>• Only one option can be selected<br>If Q23 is answered Yes then Q23.1 must display after Q23 | • Yes<br>• No<br>• Not Required<br>• Don't Know |
| 23.1 | What was the result of the security review? | Supplier Management | • Question must display if Q23 is answered (Yes)<br>• Answer must be provided<br>• Drop down list or radio button<br>• Only one option can be selected | Free Form Text |
| 24 | Will the data be sent outside of the US? | Legal Counsel | • Question must display<br>• Answer must be provided<br>• Drop down list or radio button<br>• Only one option can be selected<br>• Scoring based on Option selected | 2. No<br>4. Yes<br>5. Don't Know |
| 25 | Has the creative been reviewed and approved by Legal/Compliance for marketing purposes? NOTE: Please Remeber to execute the creative approval process through MRM (URL: https://synchrony.orbisglobal.com/login.aspx?Return Url=%2f) | Legal Counsel | • When Q3 is answered (Marketing) then Q25 must display and an answer must be provided<br>• When Q3 is not answered (Marketing) then Q25 will not display.<br>• Question must display<br>• Answer must be provided<br>• Drop down list or radio button<br>• Only one option can be selected<br>• No scoring (informational) | • Yes<br>• No<br>• N/A (no creative involved) |

Fig. 4J

| Question Number | Question | Validation | Requirements | Options |
|---|---|---|---|---|
| 26 | Search and select the types of data (Data Domain(s)) associated with the data elements for this request. | Data Governance | • Question must display<br>• When Q6 is answered (External Library) then answer is optional<br>• Answer must be provided when Q6 other than External Library<br>• Display and select on Business Asset type Data Domain<br>• Display and Select Text Field<br>• Full list should display<br>• One or more options can be selected<br>• No scoring (informational) | • Display & Select Text Field of Asset Business<br>• Retail Card<br>• Payment Solutions |
| 28 | Select the business unit/sales platform associated with this data transmission request? | Legal Counsel | • Question must display<br>• Answer must be provided<br>• Drop down list or radio button (should be the allowed values for busines term "business unit" excluding Acronyms)<br>• Multiple options can be selection<br>• No scoring (informational) | • CareCredit<br>• Deposits |
| 29 | Is the quality of the data being shared within its defined threshold? (Data Quality Score) | Data Governance | • Question must display<br>• Question is Optional to answer<br>• Drop down list or radio button<br>• Only one option can be selected<br>• Scoring based on Option selected | 2. No<br>4. Yes<br>5. Don't Know |
| 30 | What is the data privacy classification associated with this data request?<br>Link to Privacy Policy:<br>https://libraries.synchronyfinancial.com/download?fi ad=1443573020128entity_id=13457360101&d=101 | Information Security | • Question must display<br>• Answer must be provided<br>• Drop down list or radio button<br>• Only one option can be selected<br>• Scoring based on Option selected<br>• Answer must be provided | 1. Public<br>2. Confidential<br>3. Confidential with SPII<br>4. Restricted<br>5. Internal |
| 31 | Which of the following Restricted, Confidential with SPII or Critical Data Elements are included in this request? (Select all that apply) | Data Governance | • Full list must be displayed<br>• Multiple options can be selection<br>No Scoring<br>• Question must display<br>• Answer must be provided | - <br>- <br>- |
| 32 | Select the Encryption Method to be used for this data transfer | Information Security | • Drop down list or radio button | PGP<br>Pkzip<br>NDM<br>SFTP<br>OpenPGP |

Fig. 4K

| Question Number | Question | Validation | Requirements | Options |
|---|---|---|---|---|
| 33 | If the data transmission request is for a Regulatory Report, does the report have the required internal approvals? | Supervisory Affairs | • When Q12 is answered (Regulatory Agency) then Q33 must display and an answer must be provided<br>• When Q12 is not answered (Regulatory Agency) then Q33 will not display.<br>• Question must display if triggered by Q12<br>• Answer must be provided<br>• Drop down list or radio button<br>• Only one option can be selected<br>• Scoring based on Option selected | 2. Yes<br>4. No<br>5. Don't Know |
| 33.1 | Select who approved the Regulatory Report from the drop down list | Supervisory Affairs | • When Q33 is answered (Yes) then Q33.1 is displayed after Q33<br>• Answer must be provided<br>• Drop down list or radio button<br>• Only one option can be selected<br>• No scoring (informational) | • General Counsel<br>• Deputy General Counsel |
| 33.2 | Select the date the Regulatory Report was approved. | Supervisory Affairs | • When Q33 is answered (Yes) then Q33.2 is displayed after Q33.1<br>• Answer must be provided<br>• Calendar allowing only one Month, Day and year to be selected<br>• No scoring (informational) | Calendar Date Selection Field |
| 33.3 | Provide the Regulatory Report Evidence complete URL(s) of the supporting documentation, e.g. Waterfall, etc. | n/a | • When Q33 is answered (Yes) then Q33.3 is displayed after Q33.2<br>• Answer must be provided<br>• Upload/Attach Document field<br>• URL Text box<br>• No scoring (informational) | • Upload/Attach Document Field<br>• URL Text Field |
| 34 | Is this data transmission request related to data that was corrected due to data quality exceptions after the transmission to a Credit Bureau or consumer? | Data Governance | • Question must display<br>• Answer must be provided<br>• Drop down list or radio button<br>• Only one option can be selected<br>• No scoring (informational) | • Yes<br>• No<br>• Don't Know |
| 34.1 | Enter the associated Consumer Complaint # in the field provided. | n/a | • When Q34 is answered (Yes) then Q34.1 is displayed next<br>• Answer must be provided<br>• Free Form Text box<br>• No scoring (informational) | Free Form Text |

Fig. 4L

| Question Number | Question | Validation | Requirements | Options |
|---|---|---|---|---|
| 35 | Is World Spend data part of this request? | Legal Counsel | • Question must display<br>• Answer must be provided<br>• Drop down list or radio button<br>• Only one option can be selected<br>• No scoring (informational)<br>• When Q35 is answered (Yes) then Q35.1 is displayed next | • Yes<br>• No |
| 35.1 | What is the data level request for World Spend? | Legal Counsel | • Question must display<br>• Answer must be provided<br>• Drop down list or radio button<br>• Only one option can be selected<br>• No scoring (informational) | • Blind Data<br>• World Spend Flag<br>• World Spend Summary<br>• World Category Summary |
| 36 | Enter a brief description and/or any additional information about this request. | n/a | • Question must display<br>• Answer is optional<br>• Free Form Text box<br>• No scoring (informational) | Free Form Text |
| 37 | Search and select the email address(s) to be Cc'd on request. | n/a | • Question must display<br>• Answer is optional<br>• Drop down list or radio button<br>• One or more options can be selected<br>• No scoring (informational) | Names & Roles |

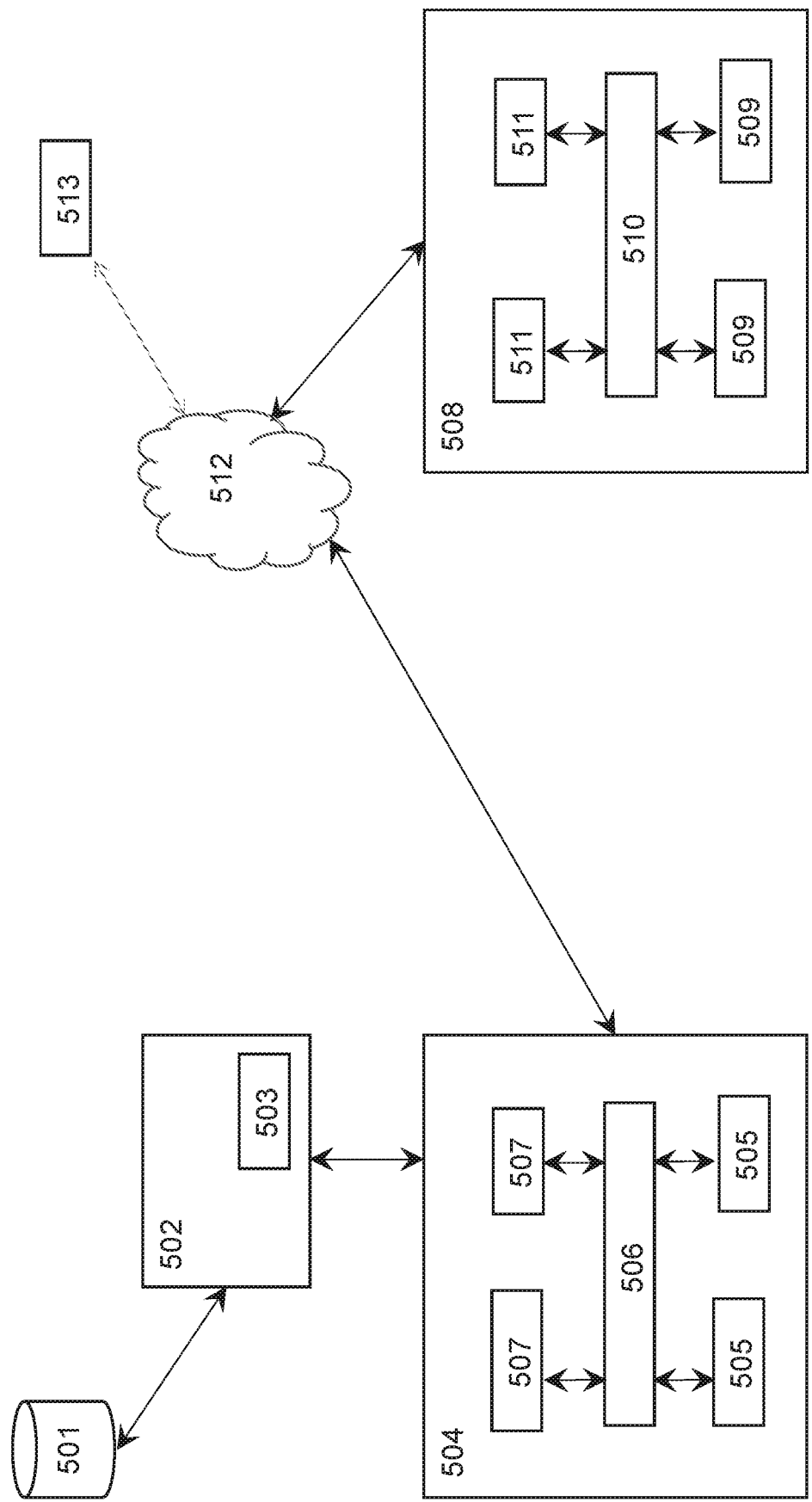

SYSTEM AND METHOD FOR MANAGING DATA SHARE REQUESTS

CROSS-REFERENCE TO RELATED APPLICATION

The present application is a continuation of U.S. application Ser. No. 15/666,800 filed Aug. 2, 2017, which is incorporated in its entirety herein by reference.

FIELD OF THE INVENTION

The invention relates to managing and assessing requests to share an organization's data with third parties.

BRIEF SUMMARY OF EXEMPLARY EMBODIMENTS OF THE INVENTION

Exemplary embodiments of the invention are directed to a system and method for managing data share requests. An electronic form processing module receives a request to share data relating to an organization with an entity not affiliated with the organization. The request includes responses to questions presented in an electronic form. At least some of the questions presented in the electronic form are presented based on a response to a previously asked question in the electronic form. A score calculation module calculates a score based on the responses to the questions presented in the electronic form. A risk analysis module determines whether to approve, deny or escalate the request to share data based on the score.

In some embodiments, the questions are related to a recipient of the request to share data; a purpose associated with the request to share data; content of the data that is the subject of the request to share data; a source of the data that is the subject of the request to share data; and/or a method of transmitting the data that is the subject of the request to share data.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 3 is a flow diagram illustrating an exemplary process of the present invention;

FIGS. 4A-4L are exemplary questions within the associated process in accordance with an exemplary embodiment of the present invention; and FIG. 5 is an exemplary system for carrying out embodiments of the present invention.

DETAILED DESCRIPTION OF THE EXEMPLARY EMBODIMENTS

Figure 1:
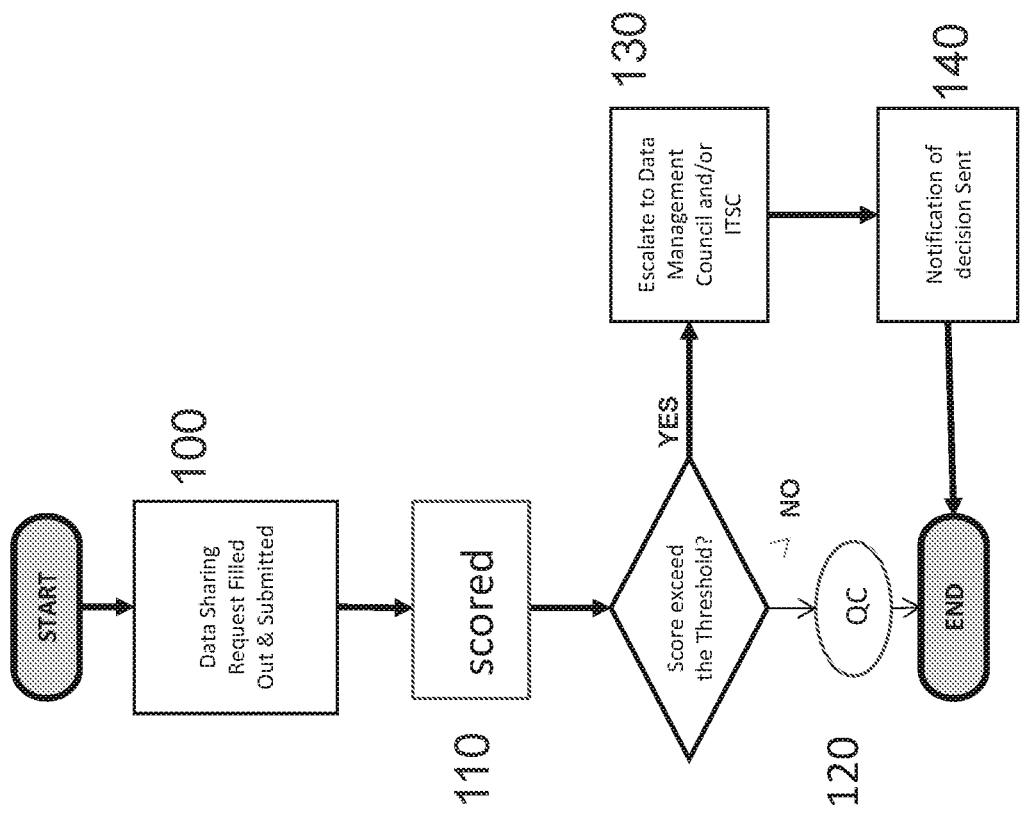
FIG. 1 is a flow diagram illustrating an exemplary process of the present invention.

The systems and methods of the present invention employ new technology used to process requests to share data relating to an organization with an entity that is not affiliated with the organization. More particularly, if data is sought to be transmitted to or shared with external parties (e.g., those that are not part of an organization's legal structure), the inherent risk associated with the data share request must be understood and associated controls applied, prior to the data being shared, in accordance with the organization's requirements, standards and policies. Data that is deemed to have inherent risk above what the organization is willing to tolerate must be approved by way of an established process prior to it being shared.

Existing processes that are used to analyze data share requests are largely implemented in silos, with different departments within an organization analyzing the data share request from a different perspective (e.g., separate reviews for legal, IT security, regulatory affairs, and compliance). This process lacks in efficiency, transparency, and consistency of results.

The present invention presents a unified method of assessing risk associated with a data share request. More particularly, a data share request is reviewed with reference to several risk factor themes, in an exemplary embodiment, as follows:

Recipient: Some recipients are covered under policies (e.g., Credit Bureaus, regulators) or may have contractual agreements in place (e.g., client partners or vendor suppliers) that may influence the assessment of risk associated with the data share request. Other recipients may simply be unauthorized to receive certain kinds or any data.

Purpose: It may be considered whether the quality of the data sought to be shared meets the associated business requirements or the recipients' expectations. The intended purpose of the data share request may be in conflict with the policies of the organization. In some situations, business records are created by the organization, but managed by a third party and may not meet the organization's policies with regard to records and information management.

Content: Critical data elements associated with the data share request may not be of sufficient quality, nor properly defined, for their intended use/purpose. For example, data provided to credit bureaus and consumers may not be measured for accuracy and completeness before it is transmitted. In still other examples, regulatory documents may need to be approved by the organization's counsel before transmission to a third party.

Source: In some instances, critical data elements or business records may be sourced from unauthorized repositories or outside of a defined system of record.

Transmission Method: The transmission method may also be considered. For example, external data transmissions are not implemented in accordance with certain standards applicable to an organization. Information sent over the Internet may be intercepted or altered during transmission or in storage. Individually identifiable customer information and other sensitive information may not be transmitted securely and/or inappropriately used or disclosed.

The process for assessing data share requests should be considered in light of a variety of policies. For example, data that is subject to the policies of the organization or to regulations/laws requires a risk assessment, review and, where appropriate, risk acceptance before it is shared or transmitted to an external entity. By way of further example, data transmissions need to be fully inventoried, risk assessed against policies and legal requirements, tracked and reported upon. Existing, recurring transmissions are periodically re-evaluated based upon their level of risk. Further, critical data transmitted to a third party is associated with a business process that drives the requirements for what is transmitted (in/out bound). Still further, only data required to support the process is transmitted. Moreover, changes to existing approved data transmission arrangements are monitored, assessed, and subjected to re-approval to the extent that such changes are material or significant. By way of other considerations, controls and measurable risk management processes are implemented to limit data transmission to what is needed to service partner relationships and meet the business obligations of an organization and protect data transmissions. Finally, non-standard data transmissions must follow the defined escalation process and are subject to exception tracking. Approvals and exceptions should not be granted for data transmission requests that violate legal requirements.

By way of overview of the inventive process, reference is made to FIG. 1. The individual presenting a data share request completes a form. The data entered onto the form is submitted to the computer system and assessed, in step 100. Based on the data entered into the form, in view of the assessment, the risk associated with the data share request is scored, in step 110. When risks associated with a data share request exceed a baseline threshold, the request will be escalated to upper level management of an organization for risk review, in step 130. Otherwise, the data share request undergoes a quality control review, in step 120. A decision on the data share request is sent to the applicable team, in step 140, and the team implements the decision, thereby ending the process.

Figure 2:
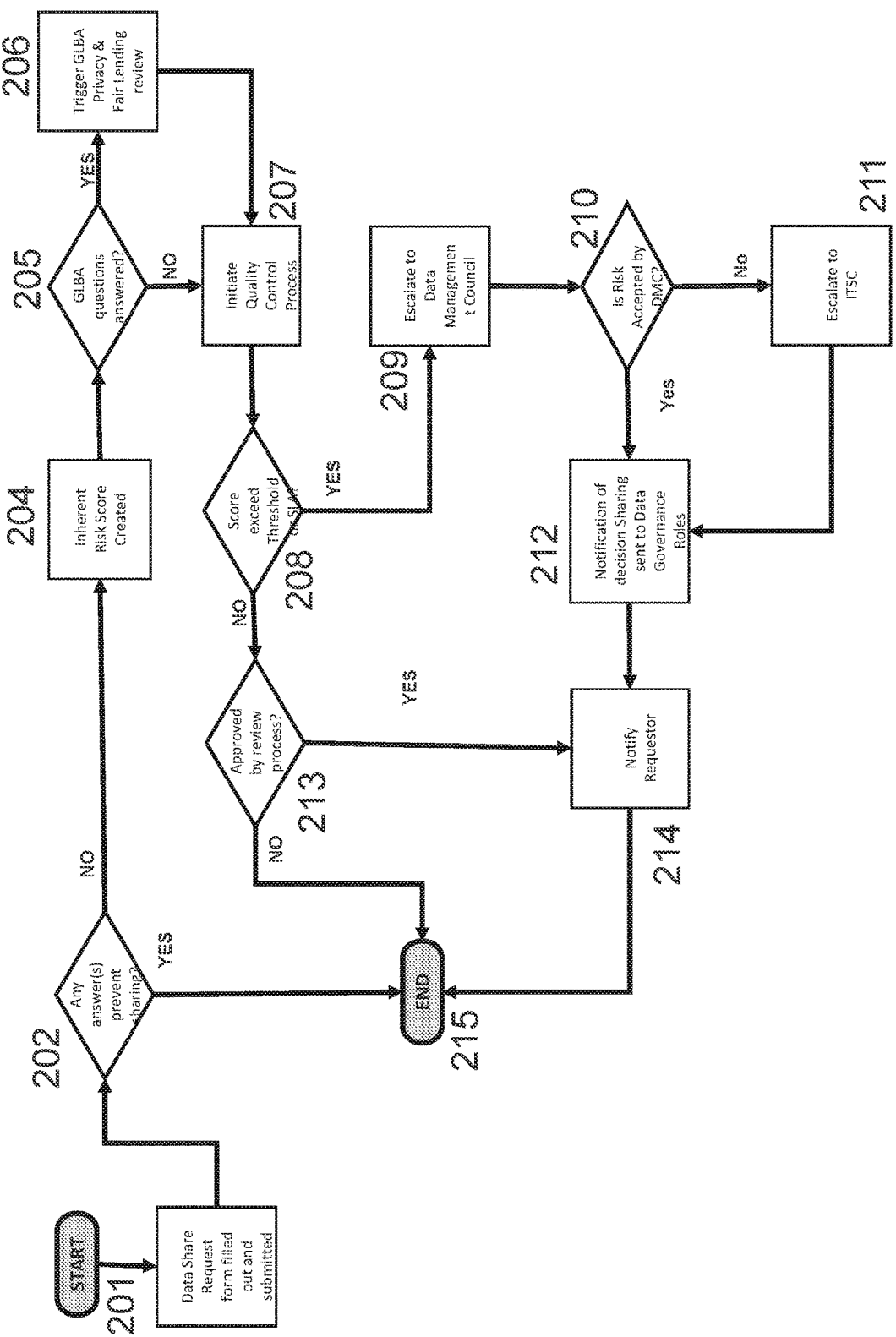
FIG. 2 is a flow diagram illustrating an exemplary process of the present invention.

With reference to FIG. 2, a more detailed description of the process flow is described. In step 201, the data sharing request form is completed by the individual requesting the data share and the form is submitted to the system. In step 202, the answers to the questions in the form are evaluated to determine if data sharing should be prohibited. If so, in step 215, the process ends. If not, in step 204, the answers to the questions in the form are assessed and a risk score is produced, in step 204. In step 205, it is determined whether answers to certain of the questions that may be particularly relevant to an organization (e.g., Gramm-Leach-Bliley Act for financial services companies), in which case a more detailed review of these issues may be conducted in step 206 and it may be determined whether the nature of the data sharing request needs to be changed (e.g., whether the data share request form should be modified or amended and resubmitted, if warranted, pursuant to this this additional, in-depth review). If so, step 201 may be reinitiated. In step 207, additional quality control processes are initiated and the quality control process is undertaken. In step 207, based on the quality control review, it is determined whether the data share request form requires modification or amendment. If so, step 201 may be reinitiated. If not, in step 208 it is determined (by the computer system) whether the score exceeds a threshold score (e.g., more than 3.5). If not, In step 213, a quality control review process executes and determines if it is appropriate to share the data. If so, a notification is sent to the requestor in step 214 with the process ending at step 215. If not, the process may end at step 215 or result in the process restarting with step 201. If in step 208 the risk score exceeds 3.5, then step 209 is executed. In step 209, the request is escalated for further review (e.g., data management council of an organization). In step 210, it is determined whether the risk is acceptable. If not, in step 211 the request is further escalated for executive level review (e.g. a management sub-committee or committee of an organization,). In so, in step 212 a notification of the decision is sent to data governance personnel within the organization and, in step 214, the requestor is notified.

FIG. 3 describes an exemplary process for implementing quality control (i.e., step 207 of FIG. 2) in more detail. In step 301, the individual initiator of the data share request answers the questions posted in the request form and, in step 302, the answers to the questions are submitted to the system and scored. Steps 303, 304, and 305 are the equivalent of steps 205 and 206 of FIG. 2. As part of step 306, steps 308 and 309 are executed such that the questions and associated responses that are associated with Information Security risks are evaluated by Information Security professionals (e.g., is the data being shared considered personally identification information (PII), is the appropriate method (e.g. email, file feed, internet portal) for how the data will be shared selected, is the appropriate form of encryption or protection selected). In step 309, Information Security can challenge the responses provided should the combinations violate policy. In such instances where a challenge is raised, the request is sent back to the original requestor in step 307 for revision. Otherwise, upon successful review, the data share request will progress to the next quality control step. In steps 310 and 311, if data is being shared with an entity that has a relationship with the company (such as a vendor/supplier, client/partner, or partner vendor), a Supplier Management review is conduced. In step 310, it is considered whether the existing contractual relationship with that entity covers data sharing (e.g., has appropriate confidentiality provisions). Should the combination of data being shared misalign with the nature of the relationship with the company contractually, those answers can be challenged in step 311, resulting in the request being sent back to the requestor for revision in step 307. Once the request completes steps 308 through 311 successfully, the process moves to step 312. In step 312, questions related to sharing data with regulators are reviewed by a Supervisory Affairs group following the same review/challenge process described previously. Based on completion of this review without challenge, a final series of Data Governance reviews take place in Steps 314 to 318, in which questions associated with data quality, data usage and types of data being shared is conducted in steps 314 and 315. In step 316, the risk score associated with the request is updated based on all answers being validated and no longer challenged. In step 316 it is determined whether (based on the risk score exceeding the risk threshold establish by the company) the data sharing request requires an escalated approval (step 317) or if risk acceptance (step 318) is required. If the risk associated with sharing the data requested is not risk accepted, the request is rejected and requestor notified (in step 320). Otherwise, if the risk is accepted or if it the risk did not exceed the threshold, then the requestor is notified (in step 319) and the requestor can share the data consistent with information reviewed and approved.

FIGS. 4A through 4L illustrate the electronic form, workflow-based methodology for submitting and reviewing a data share request. For example, FIG. 4A sets forth the questions that are presented to the requestor by way of an electronic form. FIG. 4A also illustrates the form logic associated with the questions presented and question flow based on the answers to the questions along with which organizational role is involved with the information review/challenge (as described in FIG. 3). For example, with reference to FIG. 4B, if question 6 is answered using the 'External Library' option, then questions 6.1, 6.2, 6.3, 6.4 and 6.5 are presented but, if question 6 is answered using the 'Real-time access' option, then questions 6.6, 6.7, 6.8, 6.9, 6.10 and 6.11 are presented, but if question 6 is answered any other option, then question 7 is presented (skipping question 6.1 through 6.11 inclusively). The answer options are also associated with a number, in the example shown. For example, there for 5 options for answers to question 6: 1—physical media; 2—electronic data exchange; 4—external library; 4—Real-time access and 5—email. The numbers associated with these options are used in the scoring, as described in more detail below. Some answers to questions are informational and not associated with scoring. Certain of the answer fields are free form text fields (e.g., question 1), and some may be through drop down menu (e.g., single selection, multiple selection). Some fields may allow for attaching documents for review or accept as an input a URL pointing to materials for review. FIGS. 4B through 4L show similar examples of answer-based presentation of the electronic form questions.

In one embodiment, a score is determined based on the average of the attributes that contain a numeric value (e.g., step 204 of FIG. 2). By way of a simplified example, if question 3 is answered with a numeric value of 4, question 6 is answered with a value of 3, and question 11 is answered with a value of 5, the score for these questions will be 4+3+5/3=4. The score is then compared to a threshold (e.g., step 208 of FIG. 2). In this example, a 5 point scale may be used and the threshold may be 2. If the score is less than 2, then (subject to quality control review) the data share request may be granted. If the score is 2 or greater, additional review and assessment may be required. Other point scales, scoring techniques or thresholds may be used within the scope of the present invention. Also, other methods of determining whether the risk associated with a data share request is acceptable are within the scope of the present invention. For example, a score may not be used, but another quantitative, objective evaluator of risk may be used, within the scope of the present invention.

A computer is required to carry out the methods of the present invention because the assessment of the request using the workflows requires a significant number of permutations. The number of questions, options and combinations to both create a risk score and to ensure appropriate real-time workflow routing of review results in a deterministic combinatorial problem. Deterministic problems of this size (e.g. over a million combinations—60 questions to the 3rd (average number of sub-questions spawned multiplied by 5 (average number of options with scores)) require a computer system to calculate in real-time fashion.

In some embodiments, the methods are carried out by a system that employs a client/server architecture such as, for example, the exemplary embodiments described as follows with reference to FIG. 5. The data that may be used as an input to the system and the outputs from the system(s) may be stored in one or more databases 501. Database server(s) 502 may include a database services management application 503 that manages storage and retrieval of data from the database(s) 401. The databases 501 may be relational databases; however, other data organizational structures may be used without departing from the scope of the present invention. Thus, for example, the electronic forms, as well as the data input into the forms, the calculated scores, and data relating to the decisions as to the data share request, may be stored in databases 501.

One or more application server(s) 504 are in communication with the database server 502. The application server 504 communicates requests for data to the database server 502. The database server 502 retrieves the requested data. The application server 504 may also send data to the database server 502 for storage in the database(s) 501. The application server 504 comprises one or more processors 505, non-transitory computer readable storage media 507 that store programs (computer readable instructions) for execution by the processor(s), and an interface 506 between the processor(s) 505 and computer readable storage media 507. The application server 504 may store the computer programs and code used to implement the methods of the present invention. Thus, for example, the application server 504 would store the software necessary to implement the electronic form, work flows, calculate a score from the responses, and make a decision as to whether the risk associated with the data share request is acceptable.

To the extent data and information is communicated over a network (e.g., the Internet or an Intranet), one or more network servers 508 may be employed. The network server 508 also comprises one or more processors 509, computer readable storage media 511 that store programs (computer readable instructions) for execution by the processor(s), and an interface 510 between the processor(s) 509 and computer readable storage media 511. The network server 508 is employed to deliver content that can be accessed through the communications network 512, e.g., by an end user employing computing device 513. When data is requested through an application, such as an Internet browser, the network server 508 receives and processes the request. The network server 508 sends the data or application requested along with user interface instructions for displaying an interface on device 513.

The computers referenced herein are specially programmed to perform the functionality described herein.

The non-transitory computer readable storage media (e.g., 507 or 511) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed:

1. A computer-implemented method comprising:
   receiving, at a data share management system including one or more processors, one or more answers from a unified electronic form, wherein the unified electronic form presents questions assessing a plurality of risk factors and analysis silos associated with a set of data requested in a data share request, wherein the analysis silos are associated with organizational roles associated with the plurality of risk factors for the set of data, and wherein the one or more answers are associated with a requestor device requesting to share the set of data with a third party;
   dynamically assessing the plurality of risk factors associated with the data share request using a workflow with dynamic form logic using additional questions presented to the requestor by way of the unified electronic form in response to the one or more answers, wherein the plurality of risk factors correspond to a plurality of risk types associated with the set of data, wherein risk factors are associated with validation endpoints, and wherein the validation endpoints are associated with the analysis silos;
   determining a first score for a first silo associated with the one or more answers from the unified electronic form based on the plurality of risk factors and the workflow, wherein the first score is associated with a first risk type;
   determining a second score for a second silo associated with the one or more answers from the unified electronic form based on the plurality of risk factors and the workflow, wherein the second score is associated with a second risk type;
   determining that the first score and the second score exceed a corresponding threshold determined in association with the workflow, wherein the first risk type and the second risk type correspond to two or more different validation endpoints of the workflow; and
   escalating the data share request based on a routing associated with the workflow and the determining that the first score and the second score exceed the corresponding threshold.

2. The method of claim 1, wherein assessing the plurality of risk factors comprises:
   presenting a series of questions regarding the plurality of risk factors, wherein the questions are presented within the unified electronic form, and wherein assessing the plurality of risk factors is based on the one or more answers to the series of questions.

3. The method of claim 2, wherein the series of question is presented in a sequence in accordance with form logic, and wherein one or more subsequent questions are presented in real-time based on an answer to a previous question.

4. The method of claim 2, further comprising:
   determining that one or more of the validation endpoints has raised a challenge to one or more of the one or more answers; and
   sending the data share request back to the requestor device.

5. The method of claim 1, wherein assessing the plurality of risk factors associated with the data share request comprises:
   determining that the data share request requires one or more modifications;
   allowing the requestor device to modify the data share request;
   receiving a modified data share request; and
   assessing the modified data share request.

6. The method of claim 1, further comprising:
   determining that two or more validation endpoints have approved the data share request; and
   allowing the set of data to be shared over a communication network with an unaffiliated third party in accordance with the data share request based on the determination.

7. The method of claim 1, further comprising:
   determining that the one or more answers are validated based on two or more validation endpoints not challenging any of the one or more answers; and
   allowing the set of data to be shared over a communication network with an unaffiliated third party in accordance with the data share request based on the determination.

8. The method of claim 1, further comprising determining a score for each of the plurality of risk types by solving a deterministic combinatorial problem in real-time.

9. The method of claim 1, wherein the data share request is among a plurality of recurring data share requests, and further comprising:
   re-evaluating the data share request periodically.

10. The method of claim 1, wherein the plurality of risk factors associated with the data share request includes at least one of: a category of the set of data, a method for how the set of data is to be shared, a form of encryption, a form of protection, a type of relationship with the third party, a contractual relationship with the third party, data quality, data usage, type of data access, and data requirements.

11. A system comprising:
   a communication interface that receives a data share request associated with a requestor device to share a set of electronic data with a third party; and
   a processor that executes instructions stored in memory, wherein the processor executes the instructions to perform operations including:
   receiving, at a data share management system including the processor, one or more answers from a unified electronic form, wherein the unified electronic form presents questions assessing a plurality of risk factors and analysis silos associated with a set of data requested in a data share request, wherein the analysis silos correspond to organizational roles for the plurality of risk factors for the set of data, and wherein the one or more answers are associated with a requestor device requesting to share the set of data with a third party;
   dynamically assessing the plurality of risk factors associated with the data share request, wherein dynamically assessing includes using a workflow with dynamic form logic, wherein the dynamic form logic selects additional questions for presentation to the requestor by way of the unified electronic form and in response to the one or more answers, wherein the plurality of risk factors correspond to a plurality of risk types associated with the set of data, wherein risk factors are associated with validation endpoints, and wherein the validation endpoints are associated with the analysis silos;

determining a first score for a first silo associated with the one or more answers from the unified electronic form based on the plurality of risk factors and the workflow, wherein the first score is associated with a first risk type;

determining a second score for a second silo associated with the one or more answers from the unified electronic form based on the plurality of risk factors and the workflow, wherein the second score is associated with a second risk type;

determining that the first score and the second score exceed a corresponding threshold associated with the workflow, wherein the first risk type and the second risk type correspond to two or more different validation endpoints of the workflow; and escalating the data share request based on a routing associated with the workflow and a determination that the first score and the second score exceed the corresponding threshold.

12. The system of claim 11, wherein the processor assesses the plurality of risk factors by:

presenting a series of questions regarding the plurality of risk factors, wherein the questions are presented within the unified electronic form, and wherein assessing the plurality of risk factors is based on the one or more answers to the series of questions.

13. The system of claim 12, wherein the series of question is presented in a sequence in accordance with form logic, and wherein one or more subsequent questions are presented in real-time based on an answer to a previous question.

14. The system of claim 12, wherein the processor executes further instructions to perform operations including:

determining that one or more of the validation endpoints has raised a challenge to one or more of the one or more answers, and wherein the communication interface sends the data share request back to the requestor device.

15. The system of claim 11, wherein the processor assesses the plurality of risk factors associated with the data share request by:

determining that the data share request requires one or more modifications;

allowing the requestor device to modify the data share request;

receiving a modified data share request; and assessing the modified data share request.

16. The system of claim 11, wherein the processor executes further instructions to perform operations including:

determining that two or more validation endpoints have approved the data share request; and allowing the set of data to be shared over a communication network with an unaffiliated third party in accordance with the data share request based on the determination.

17. The system of claim 11, wherein the processor executes further instructions to perform operations including:

determining that the one or more answers are validated based on two or more validation endpoints not challenging any of the one or more answers; and allowing the set of data to be shared over a communication network with an unaffiliated third party in accordance with the data share request based on the determination.

18. The system of claim 11, further comprising determining a score for each of the plurality of risk types by solving a deterministic combinatorial problem in real-time.

19. The system of claim 11, wherein the data share request is among a plurality of recurring data share requests, and wherein the processor executes further instructions to:

re-evaluate the data share request periodically.

20. The system of claim 11, wherein the plurality of risk factors associated with the data share request includes at least one of: a category of the set of data, a method for how the set of data is to be shared, a form of encryption, a form of protection, a type of relationship with the third party, a contractual relationship with the third party, data quality, data usage, type of data access, and data requirements.

21. A non-transitory, computer-readable storage medium, having embodied thereon a program executable by a processor to perform a method comprising:

receiving, at a data share management system including one or more processors, one or more answers from a unified electronic form, wherein the unified electronic form presents questions assessing a plurality of risk factors and analysis silos associated with a set of data requested in a data share request, wherein the analysis silos correspond to organizational roles for the plurality of risk factors for the set of data, and wherein the one or more answers are associated with a requestor device requesting to share the set of data with a third party;

dynamically assessing the plurality of risk factors associated with the data share request, wherein dynamically assessing includes using a workflow with dynamic form logic, wherein the dynamic form logic selects additional questions for presentation to the requestor by way of the unified electronic form and in response to the one or more answers, wherein the plurality of risk factors correspond to a plurality of risk types associated with the set of data, wherein risk factors are associated with validation endpoints, and wherein the validation endpoints are associated with the analysis silos;

determining a first score for a first silo associated with the one or more answers from the unified electronic form based on the plurality of risk factors and the workflow, wherein the first score is associated with a first risk type;

determining a second score for a second silo associated with the one or more answers from the unified electronic form based on the plurality of risk factors and the workflow, wherein the second score is associated with a second risk type;

determining that the first score and the second score exceed a corresponding threshold associated with the workflow, wherein the first risk type and the second risk type correspond to two or more different validation endpoints of the workflow; and escalating the data share request based on a routing associated with the workflow and a determination that the first score and the second score exceed the corresponding threshold.

22. The non-transitory, computer-readable storage medium of claim 21, wherein assessing the plurality of risk factors comprises:

presenting a series of questions regarding the plurality of risk factors, wherein the questions are presented within the unified electronic form, and wherein assessing the plurality of risk factors is based on the one or more answers to the series of questions.

23. The non-transitory, computer-readable storage medium of claim 21, wherein a series of question is presented in a sequence in accordance with form logic, and wherein one or more subsequent questions are presented in real-time based on an answer to a previous question.

24. The non-transitory, computer-readable storage medium of claim 21, further comprising instructions executable to:
   determining that one or more of the validation endpoints has raised a challenge to one or more of the one or more answers; and
   sending the data share request back to the requestor device.

25. The non-transitory, computer-readable storage medium of claim 21, wherein assessing the plurality of risk factors associated with the data share request comprises:
   determining that the data share request requires one or more modifications;
   allowing the requestor device to modify the data share request;
   receiving a modified data share request; and
   assessing the modified data share request.

26. The non-transitory, computer-readable storage medium of claim 21, further comprising instructions executable to:
   determining that two or more validation endpoints have approved the data share request; and
   allowing the set of data to be shared over a communication network with an unaffiliated third party in accordance with the data share request based on the determination.

27. The non-transitory, computer-readable storage medium of claim 21, further comprising instructions executable to:
   determining that the one or more answers are validated based on two or more validation endpoints not challenging any of the one or more answers; and
   allowing the set of data to be shared over a communication network with an unaffiliated third party in accordance with the data share request based on the determination.

28. The non-transitory, computer-readable storage medium of claim 21, further comprising determining a score for each of the plurality of risk types by solving a deterministic combinatorial problem in real-time.

29. The non-transitory, computer-readable storage medium of claim 21, wherein the data share request is among a plurality of recurring data share requests, and further comprising instructions executable to:
   re-evaluate the data share request periodically.

30. The non-transitory, computer-readable storage medium of claim 21, wherein the plurality of risk factors associated with the data share request includes at least one of: a category of the set of data, a method for how the set of data is to be shared, a form of encryption, a form of protection, a type of relationship with the third party, a contractual relationship with the third party, data quality, data usage, type of data access, and data requirements.

* * * * *